United States Patent
Kuribayashi

(10) Patent No.: US 12,405,549 B2
(45) Date of Patent: Sep. 2, 2025

(54) OPTICAL SCANNING DEVICE

(71) Applicant: TOSHIBA TEC KABUSHIKI KAISHA, Tokyo (JP)

(72) Inventor: Yasushi Kuribayashi, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 397 days.

(21) Appl. No.: 18/177,781

(22) Filed: Mar. 3, 2023

(65) Prior Publication Data
US 2024/0295835 A1   Sep. 5, 2024

(51) Int. Cl.
G03G 15/043   (2006.01)
G02B 26/12   (2006.01)
G03G 15/04   (2006.01)

(52) U.S. Cl.
CPC ....... *G03G 15/0435* (2013.01); *G02B 26/123* (2013.01); *G03G 15/0409* (2013.01)

(58) Field of Classification Search
None
See application file for complete search history.

(56) References Cited

U.S. PATENT DOCUMENTS

| | | | |
|---|---|---|---|
| 2008/0084611 A1* | 4/2008 | Gardner | G02B 26/125 359/619 |
| 2014/0092196 A1 | 4/2014 | Masuda | |
| 2014/0118455 A1* | 5/2014 | Kuribayashi | G02B 5/005 359/205.1 |

FOREIGN PATENT DOCUMENTS

| | | |
|---|---|---|
| JP | 2004-219772 | 8/2004 |
| JP | 2013-33164 | 2/2013 |

* cited by examiner

*Primary Examiner* — Michael H Caley
(74) *Attorney, Agent, or Firm* — Amin, Turocy & Watson, LLP

(57) ABSTRACT

An optical scanning device according to an embodiment includes a light source, a first optical sheet, a second optical sheet, a holder, and a polygon mirror. The light source emits light. The first optical sheet is disposed on an optical path of the light emitted from the light source. The second optical sheet is disposed on the optical path. The holder includes a pair of engaging sections with which both end portions in a bending direction of the first optical sheet are engaged and with which both end portions in a bending direction of the second optical sheet are engaged. The holder holds the first optical sheet and the second optical sheet. The polygon mirror reflects the light from the light source guided via the first optical sheet and the second optical sheet and rotates to scan a scan surface present in a reflecting direction of the light.

20 Claims, 13 Drawing Sheets

# OPTICAL SCANNING DEVICE

FIELD

Embodiments described herein relate generally to an optical scanning device that scans a scan surface with light emitted from a light source.

BACKGROUND

As an image forming apparatus such as a digital multi-function peripheral or a printer installed in a workplace, there is an apparatus including a plurality of color image forming units in order to form a color image. An optical scanning device that exposes and scans photoconductive drums of the color image forming units sometimes include quarter wavelength plates between color light sources and polygon mirrors in order to align deflection states of lights from the color light sources. As the quarter wavelength plates, there is a quarter wavelength plate obtained by sandwiching a double refraction film with glass plates to form a rigid body and bonding and fixing the rigid body to another optical element.

If it is attempted to incorporate a relatively inexpensive sheet-type wavelength plates in the device in order to reduce costs of the device, it is difficult to stably fix the wavelength plate because, for example, the wavelength plate creases. Since the sheet-type wavelength plate easily bends and has difficulty in independently standing, the sheet-type wavelength plate needs to be bonded and fixed to a holder or the like and used. Therefore, an assembly manhour for the device increases and an adhesive adheres to undesired parts of the wavelength plate. It is likely that optical performance of the wavelength plate cannot be sufficiently exerted.

DETAILED DESCRIPTION

Figure 1:
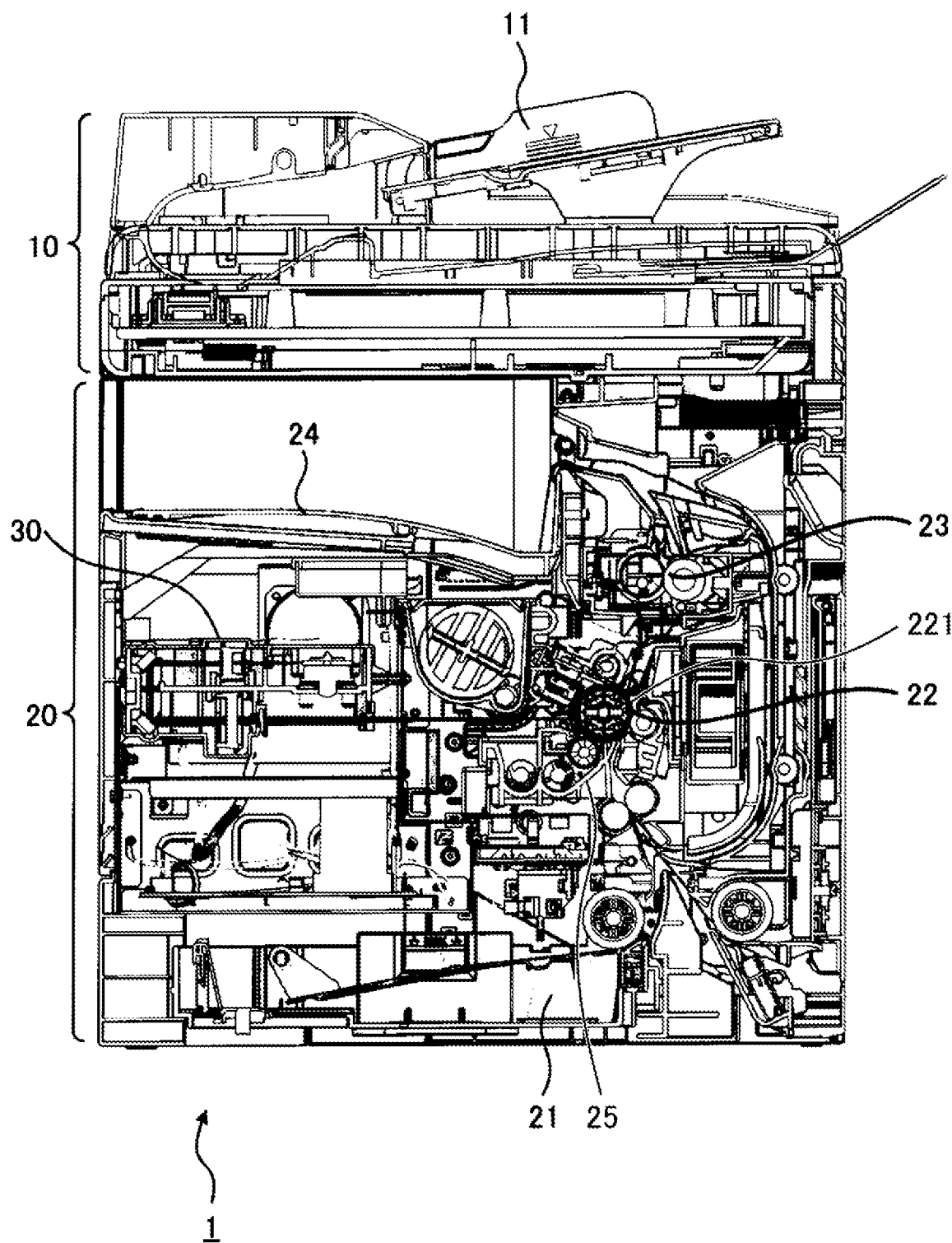
FIG. 1 is a schematic diagram of an image forming apparatus according to an embodiment.

An optical scanning device according to an embodiment includes a light source, a first optical sheet, a second optical sheet, a holder, and a polygon mirror. The light source emits light. The first optical sheet is disposed on an optical path of the light emitted from the light source in a state in which the first optical sheet is bent by elastic deformation. The second optical sheet is disposed on the optical path, capable of transmitting the light, and bendable by elastic deformation. The holder includes a pair of engaging sections with which both end portions in a bending direction of the first optical sheet are engaged by a restoration force based on the elastic deformation of the first optical sheet and with which both end portions in a bending direction of the second optical sheet are engaged by a restoration force based on the elastic deformation of the second optical sheet in a state in which the second optical sheet is bent at a curvature different from a curvature of the first optical sheet and in a same direction as the bending direction of the first optical sheet. The holder holds the first optical sheet and the second optical sheet in a state in which the first optical sheet and the second optical sheet are superimposed via a gap. The polygon mirror reflects the light from the light source guided via the first optical sheet and the second optical sheet and rotates to scan a scan surface present in a reflecting direction of the light.

Several embodiments are explained below with reference to the drawings. In the embodiments, the same components are denoted by the same reference numerals and signs and redundant explanation of the components is sometimes omitted. In the drawings referred to in the following explanation, scales of sections are sometimes changed as appropriate. In the drawings, components are illustrated to be simplified or omitted in order to facilitate understanding of explanation.

As illustrated in FIG. 1, an image forming apparatus 1 includes an image reading section 10 and an image forming section 20.

The image reading section 10 includes an auto document feeder 11. The auto document feeder 11 conveys a plurality of originals inserted in a stacked state to an original table one by one. The image reading section 10 reads image information from the original conveyed to the original table by the auto document feeder 11 or an original placed on the original table by a user and converts the image information into image data.

The image forming section 20 forms an image on paper based on the image data read from the original by the image reading section 10 or image data transmitted from external equipment such as a personal computer. The image forming section 20 includes a paper feeding cassette 21, an optical scanning device 30, a photoconductive drum 22, a developing device 25, a fixing device 23, and a paper discharge tray 24.

The paper feeding cassette 21 stores a plurality of pieces of paper in a stacked state. The image forming section 20 picks up the paper from the paper feeding cassette 21 piece by piece with a pickup roller and conveys the paper to the photoconductive drum 22 with a plurality of conveying rollers.

A surface 221 of the photoconductive drum 22 is an example of the scan surface described in the claims of this application. A direction parallel to a rotation axis of the photoconductive drum 22 in the scan surface (a direction orthogonal to the paper surface in FIG. 1) is a main scanning direction. A direction orthogonal to the main scanning direction in the scan surface (a direction in which the surface 221 of the photoconductive drum 22 rotates) is a sub-scanning direction. In the following explanation, in order to facilitate understanding of the explanation, all directions equivalent to the direction of the rotation axis of the photoconductive drum 22 are referred to as main scanning direction and all directions equivalent to a rotating direction of the surface 221 of the photoconductive drum 22 are referred to as sub-scanning direction irrespective of whether the directions are in the scan surface.

The developing device 25 develops, with a developer, an electrostatic latent image based on image data formed on the surface 221 of the photoconductive drum 22 by the optical scanning device 30 explained below. The image forming section 20 transfers a developer image formed on the surface 221 of the photoconductive drum 22 onto the paper conveyed from the paper feeding cassette 21. The fixing device 23 heats the developer image transferred on the paper and fixes the developer image on the paper. The image forming section 20 discharges the paper having passed through the fixing device 23 and subjected to image formation to the paper discharge tray 24.

Figure 2:
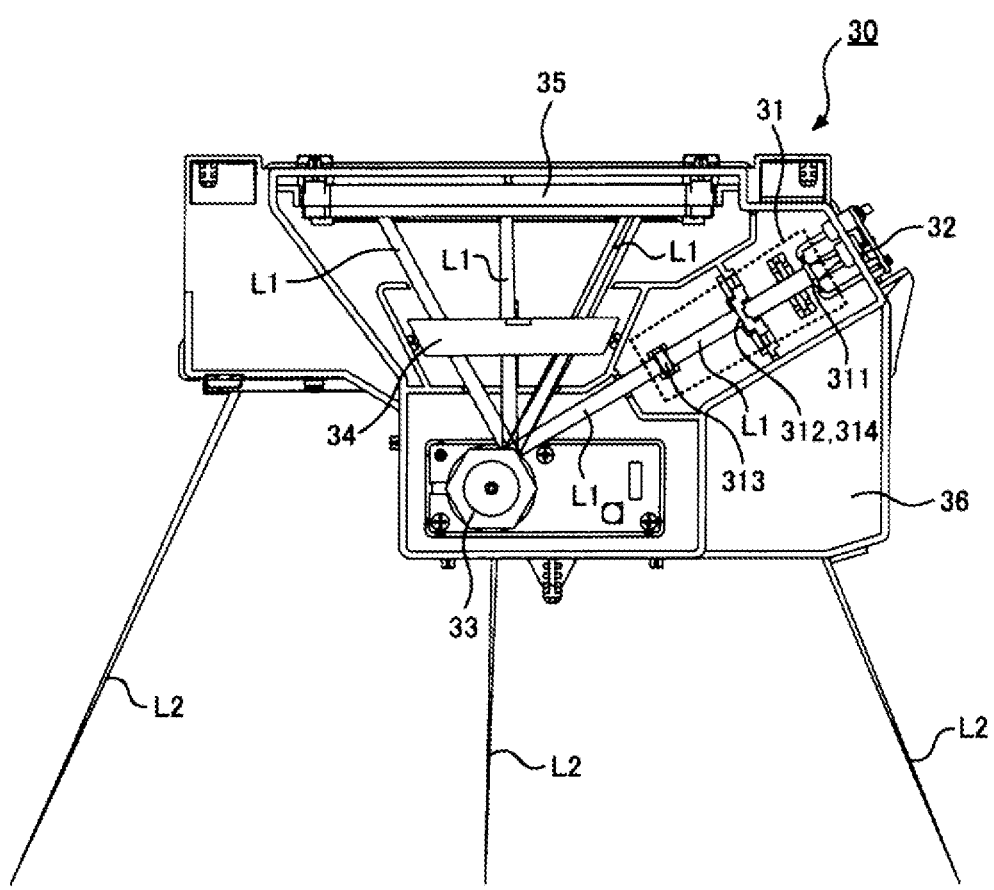
FIG. 2 is a plan view of an optical scanning device incorporated in the image forming apparatus illustrated in FIG. 1.
Figure 3:
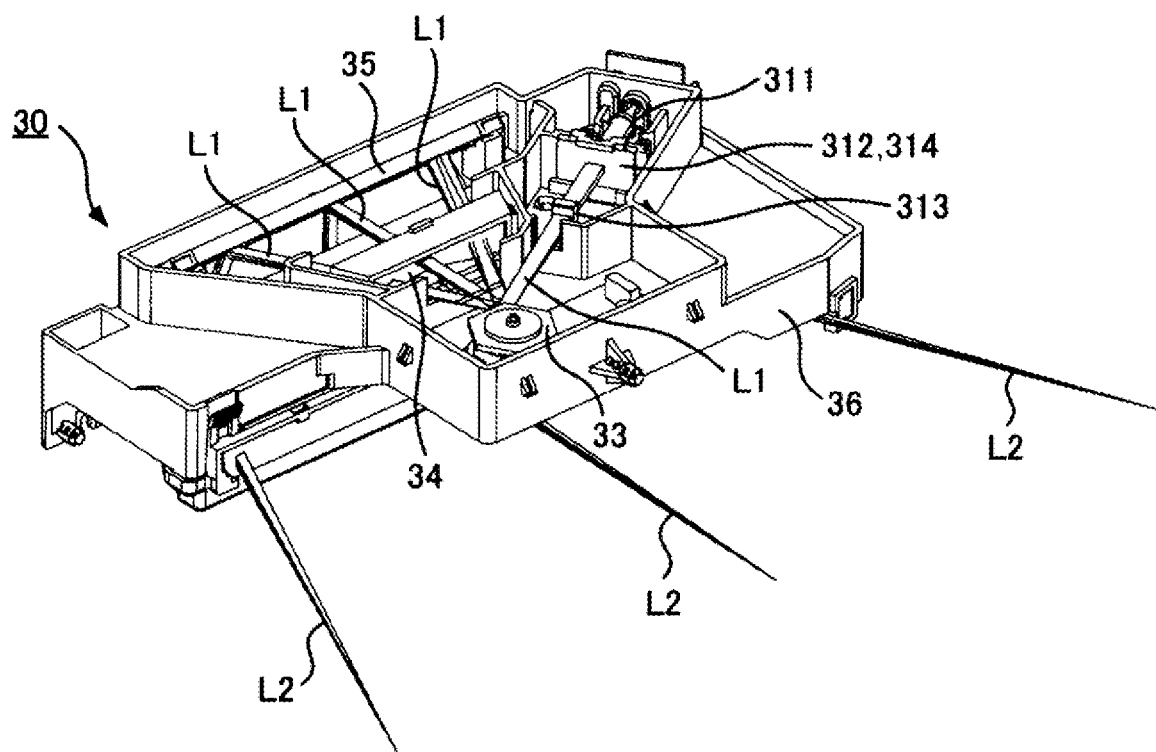
FIG. 3 is a perspective view of the optical scanning device illustrated in FIG. 2.

As illustrated in FIGS. 2 and 3, the optical scanning device 30 includes an optical system 31, a light source 32, a polygon mirror 33, a scanning lens 34, a mirror 35, and a housing 36 in which these components are housed and fixed. The optical system 31 changes characteristics of light emitted from the light source 32 and guided to the polygon mirror 33. The optical system 31 is explained in detail below.

Figure 4:
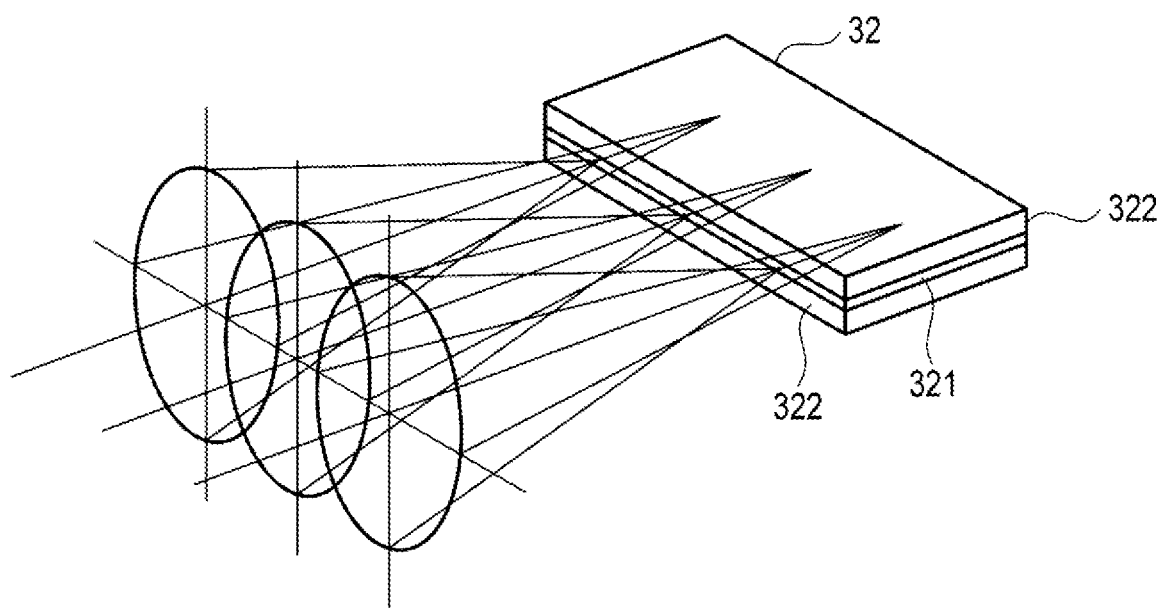
FIG. 4 is a schematic diagram illustrating a light source of the optical scanning device.

As illustrated in FIG. 4, the light source 32 is, for example, a semiconductor laser array having a structure in which a junction layer 321 emitting light is sandwiched by two reflection layers 322. The junction layer 321 includes a plurality of (in this embodiment, three) light emitting regions side by side in one direction. The plurality of light emitting regions are an example of the plurality of light emitting sections described in the claims of this application. Polarization directions of lights emitted from the light emitting regions are parallel to the junction layer 321. Therefore, if the junction layer 321 (that is, the light source 32) in a state in which the plurality of light emitting regions are arranged in the main scanning direction according to a scanning pitch in the sub-scanning direction on the scan surface is fixed to the housing 36 while being slightly tilted with respect to the main scanning direction, the polarization direction of the lights emitted from the light emitting regions changes to a direction slightly inclined from the main scanning direction and generally conforming to the main scanning direction.

The polygon mirror 33 is a rotating polygon mirror including a plurality of (in this embodiment, six) reflection surfaces on the outer circumferential surface thereof. The polygon mirror 33 is rotatably attached to the housing 36 at an angle at which a rotation axis of the polygon mirror 33 is parallel to the sub-scanning direction. The polygon mirror 33 reflects light having passed through the optical system 31 on the plurality of reflection surfaces while rotating and deflects the light reflected on the reflection surfaces to the main scanning direction.

The scanning lens 34 extends in the main scanning direction and is fixed to the housing 36. The scanning lens 34 converges the light reflected on the reflection surfaces of the polygon mirror 33 in the sub-scanning direction. The mirror 35 extends in the main scanning direction and is fixed to the housing 36. The mirror 35 reflects the light transmitted through the scanning lens 34 toward the surface 221 of the photoconductive drum 22. A plurality of mirrors 35 may be used in combination.

In FIGS. 2 and 3, parts of lights passing through the optical scanning device 30 are illustrated as rays L1 and L2. The rays L1 are parts of lights emitted from the light source 32, having passed through the optical system 31, and deflected by the polygon mirror 33. The rays L2 are parts of the lights after being reflected on the mirror 35.

Figure 5:
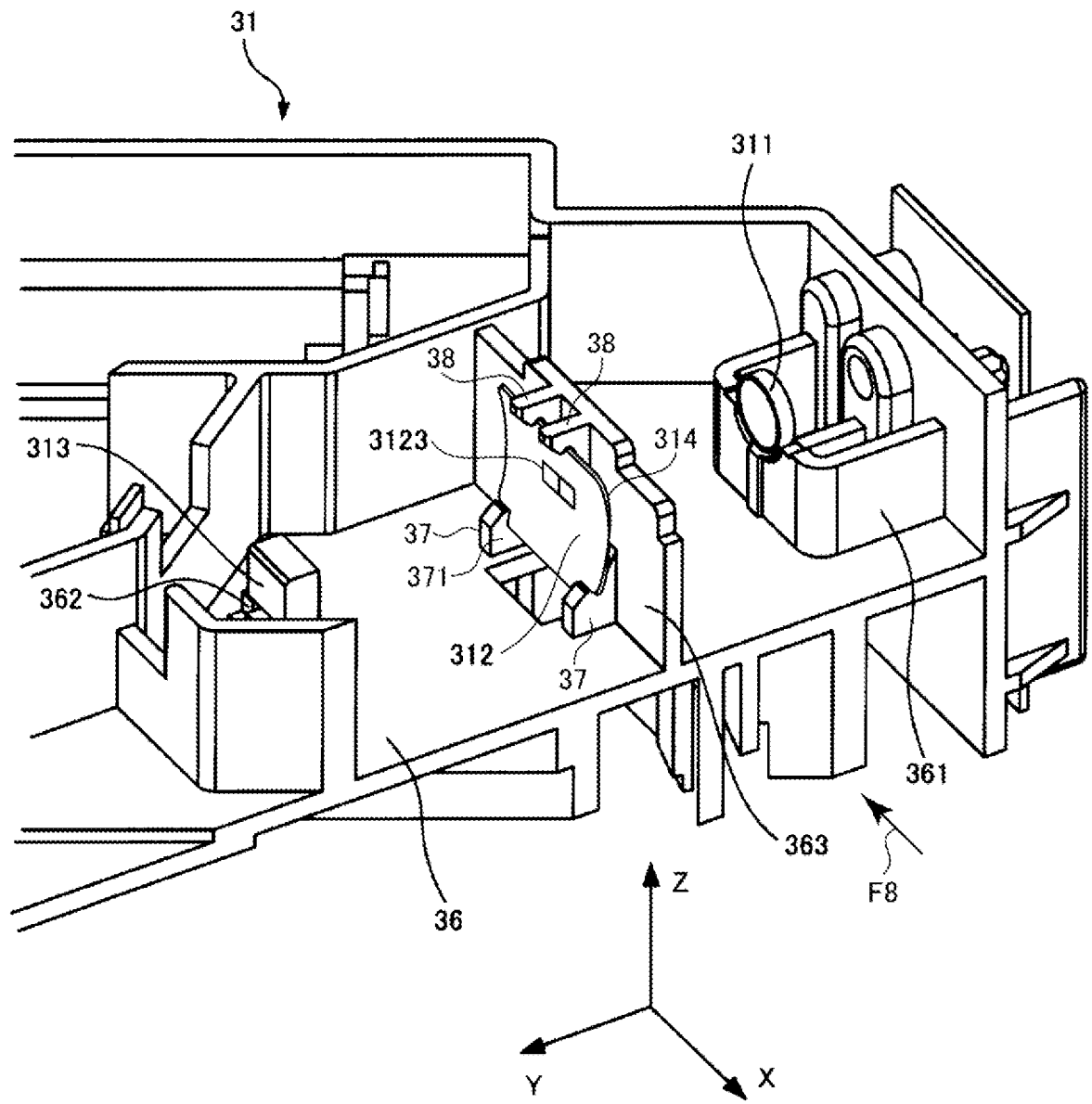
FIG. 5 is a schematic diagram illustrating an optical system of the optical scanning device.

As illustrated in FIG. 5, the optical system 31 includes a collimator lens 311, a diaphragm plate 312, a wavelength plate 314, and a cylindrical lens 313. The diaphragm plate 312 is an example of the first optical sheet described in the claims of this application. The wavelength plate 314 is an example of the second optical sheet described in the claims of this application. The members 311, 312, 313, and 314 of the optical system 31 are disposed side by side to be separated from one another in an optical axis direction. An arrow X illustrated in FIG. 5 indicates the main scanning direction, an arrow Y illustrated in FIG. 5 indicates an optical axis direction of light emitted from the light source 32, and an arrow Z illustrated in FIG. 5 indicates the sub-scanning direction. In the following explanation, the X direction, the Y direction, and the Z direction are used for explanation concerning directions.

The housing 36 integrally includes a first lens holder 361 that holds the collimator lens 311, a second lens holder 362 that holds the cylindrical lens 313, and a sheet holder 363 that holds the diaphragm plate 312 and the wavelength plate 314 to be superimposed. The sheet holder 363 is an example of the holding section described in the claims of this application.

The collimator lens 311 transmits diverging light emitted from the light source 32 and converts the diverging light into parallel light. The first lens holder 361 fixes the collimator lens 311 to the housing 36 in a position where the collimator lens 311 is separated from and opposed to the light source 32 on an emission side of light emitted from the light source 32 (a downstream side in the Y direction). The first lens holder 361 holds the collimator lens 311 such that the center of the collimator lens 311 is located on the optical axis of the optical system 31.

Figure 6:
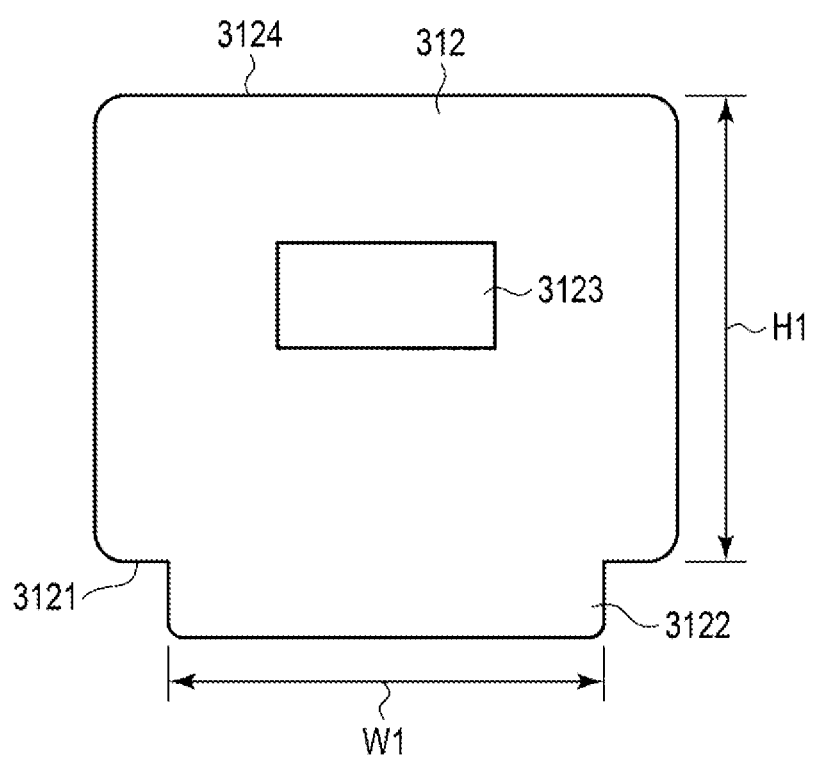
FIG. 6 is a front view illustrating a diaphragm plate included in the optical system illustrated in FIG. 5.

As illustrated in FIG. 6, the diaphragm plate 312 has a substantially rectangular plate shape and includes a substantially rectangular projecting section 3122 projecting from a lower end side 3121 in a direction (the first direction) orthogonal to the lower end side 3121. Width W1 in a direction (the second direction) orthogonal to the projecting direction of the projecting section 3122 is smaller than the width of the diaphragm plate 312. The projecting section 3122 is an example of the first projecting section described in the claims of this application.

The diaphragm plate 312 is a thin metal plate such as stainless steel that does not transmit light. The diaphragm plate 312 includes, near the center thereof, a rectangular opening section 3123 that allows light to pass. The diaphragm plate 312 blocks light other than the light passing through the opening section 3123 and defines the widths in the main scanning direction and the sub-scanning direction of the light passing through the opening section 3123. The diaphragm plate 312 has a degree of thickness bendable by elastic deformation. In the following explanation, the length in an illustrated up-down direction of the diaphragm plate 312 excluding the projecting section 3122 is represented as H1 and the width in an illustrated left-right direction of the projecting section 3122 is represented as W1. The length H1 is length in a state in which the diaphragm plate 312 is not bent.

Figure 7:
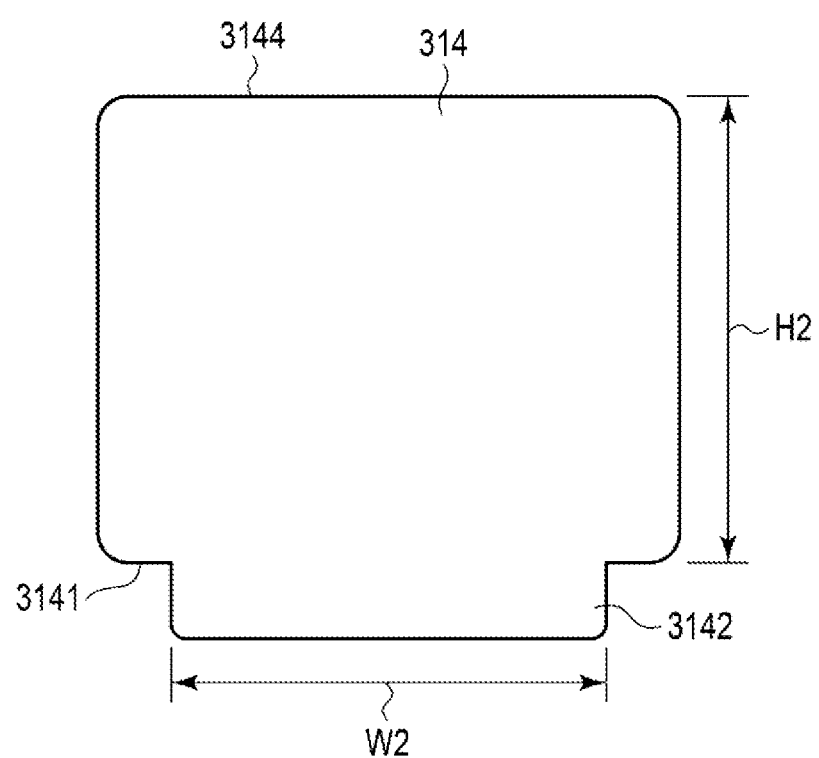
FIG. 7 is a front view illustrating a wavelength plate included in the optical system.

As illustrated in FIG. 7, the wavelength plate 314 has a substantially rectangular plate shape and includes a substantially rectangular projecting section 3142 projecting from a lower end side 3141 in a direction (the first direction) orthogonal to the lower end side 3141. Width W2 in a direction (the second direction) orthogonal to the projecting direction of the projecting section 3142 is smaller than the width of the wavelength plate 314. The projecting section 3142 is an example of the second projecting section described in the claims of this application.

The wavelength plate 314 transmits light and changes a polarization direction of the light. If a wavelength plate 314 is a half wavelength plate, the wavelength plate 314 changes the polarization direction of the light by 45°. If the wavelength plate 314 is a quarter wavelength plate, the wavelength plate 314 changes linearly polarized light to circularly polarized light. The wavelength plate 314 has a structure in which a double refraction film is sandwiched by two PET (polyethylene terephthalate) sheets and has a degree of thickness (in this embodiment, approximately 0.1 mm) bendable by elastic deformation.

The wavelength plate 314 has substantially the same shape as the shape of the diaphragm plate 312. However, length H2 in the illustrated up-down direction excluding the projecting section 3142 is slightly smaller than the length H1 of the diaphragm plate 312. The length H2 is length in a state in which the wavelength plate 314 is not bent. Width W2 of the projecting section 3142 of the wavelength plate 314 is the same as the width W1 of the projecting section 3122 of the diaphragm plate 312. The diaphragm plate 312 has higher rigidity and less easily bends than the wavelength plate 314.

By differentiating the length H2 of the wavelength plate 314 from the length H1 of the diaphragm plate 312, it is possible to differentiate a curvature of the wavelength plate 314 from a curvature of the diaphragm plate 312 as explained below. In other words, the length H2 of the wavelength plate 314 is length different from the length H1 of the diaphragm plate 312 in a degree for bending the wavelength plate 314 at the curvature different from the curvature of the diaphragm plate 312. If the length H2 of the wavelength plate 314 is set smaller than the length H1 of the diaphragm plate 312 as in this embodiment, it is possible to set the curvature of the wavelength plate 314 smaller than the curvature of the diaphragm plate 312.

The sheet holder 363 holds the diaphragm plate 312 such that the center of the opening section 3123 of the diaphragm plate 312 is located on the optical axis of the optical system 31. The sheet holder 363 holds the diaphragm plate 312 and the wavelength plate 314 in a state in which the diaphragm plate 312 and the wavelength plate 314 are superimposed via a slight gap in the optical axis direction and are bent at the different curvatures. A holding structure for the diaphragm plate 312 and the wavelength plate 314 by the sheet holder 363 is explained in detail below.

The cylindrical lens 313 allows the light transmitted through the wavelength plate 314 and having passed through the opening section 3123 of the diaphragm plate 312 to pass and converges the light in the sub-scanning direction. The second lens holder 362 fixes the cylindrical lens 313 to the housing 36 on the opposite side of the diaphragm plate 312 with respect to the collimator lens 311. The second lens holder 362 holds the cylindrical lens 313 such that the center of the cylindrical lens 313 is located on the optical axis of the optical system 31.

Figure 8:
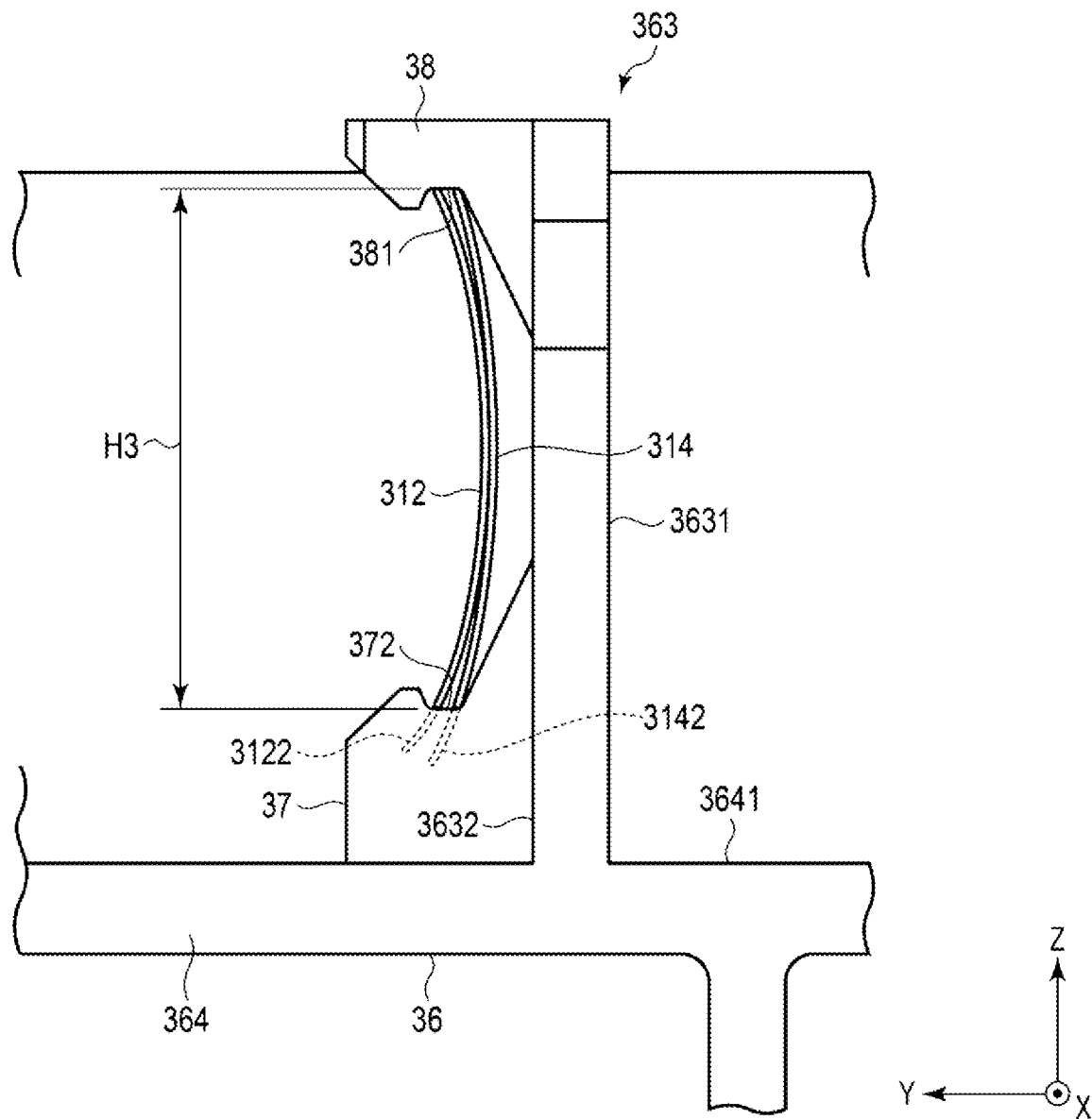
FIG. 8 is a side view of a structure in which the diaphragm plate illustrated in FIG. 6 and the wavelength plate illustrated in FIG. 7 are attached to a sheet holder, the structure being viewed from an arrow F8 direction of FIG. 5.

As illustrated in FIG. 8, the sheet holder 363 holding the diaphragm plate 312 and the wavelength plate 314 includes a flat vertical wall section 3631 integrally erected perpendicularly upward from an upper surface 3641 of a bottom wall section 364 of the housing 36. The vertical wall section 3631 is disposed in parallel to an imaginary surface orthogonal to the optical axis of the optical system 31.

The vertical wall section 3631 integrally includes a pair of lower end engaging claws 37 and a pair of upper end engaging claws 38 (FIG. 5) on a surface 3632 on the cylindrical lens 313 side. The lower end engaging claws 37 and the upper end engaging claws 38 only have to be provided in positions deviating from an optical path of light passing through the opening section 3123 of the diaphragm plate 312 and may be provided on the collimator lens 311 side of the vertical wall section 3631. The lower end engaging claws 37 and the upper end engaging claws 38 are examples of the pair of engaging sections described in the claims of this application. In FIG. 8, only one of the pair of lower end engaging claws 37 and only one of the pair of upper end engaging claws 38 are illustrated.

The pair of lower end engaging claws 37 is respectively provided to connect the surface 3632 of the vertical wall section 3631 and the upper surface 3641 of the bottom wall section 364. The pair of lower end engaging claws 37 is respectively parallel to a YZ plane. The pair of lower end engaging claws 37 is respectively present in positions separated by the same distance in directions separating from each other in the X direction from the center in the X direction of the vertical wall section 3631. Inner surfaces 371 (only one is illustrated in FIG. 5) opposed to each other of the pair of lower end engaging claws 37 are examples of the pair of positioning surfaces described in the claims of this application. The distance between the inner surfaces 371 of the pair of lower end engaging claws 37 is slightly larger than the width W1 of the projecting section 3122 of the diaphragm plate 312 and the width W2 of the projecting section 3142 of the wavelength plate 314. The pair of lower end engaging claws 37 has the same shape.

The pair of lower end engaging claws 37 includes engaging grooves 372 extending in the X direction in which the lower end sides 3121 present on both the sides in the X direction of the projecting section 3122 of the diaphragm plate 312 are respectively engaged and the lower end side 3141 present on both the sides in the X direction of the projecting section 3142 of the wavelength plate 314 are engaged. The engaging grooves 372 are present in positions separating in the Y direction from the surface 3632 of the vertical wall section 3631. The bottoms of the engaging grooves 372 are present in positions separating in the Z direction from the bottom wall section 364.

If the lower end side 3121 of the diaphragm plate 312 is engaged in the engaging grooves 372 of the pair of lower end engaging claws 37, the projecting section 3122 of the diaphragm plate 312 is inserted into between the pair of lower end engaging claws 37. Movement in the X direction of the diaphragm plate 312 can be restricted by the inner surfaces 371 of the pair of lower end engaging claws 37. If the lower end side 3141 of the wavelength plate 314 is engaged in the engaging grooves 372 of the pair of lower end engaging claws 37, the projecting section 3142 of the wavelength plate 314 is inserted into between the pair of lower end engaging claws 37. Movement in the X direction of the wavelength plate 314 can be restricted by the inner surfaces 371 of the pair of lower end engaging claws 37.

The pair of upper end engaging claws 38 is parallel to the YZ plane and integrally projects in the Y direction from the surface 3632 near the upper end of the vertical wall section 3631. The pair of upper end engaging claws 38 is respectively present in positions separated the same distance in directions separating from each other in the X direction from the center in the X direction of the vertical wall section 3631. The distance between the pair of upper end engaging claws 38 is shorter than the distance between the pair of lower end engaging claws 37. The pair of upper end engaging claws 38 includes engaging grooves 381 extending in the X direction in which an upper end side 3124 of the diaphragm plate 312 is engaged and an upper end side 3144 of the wavelength plate 314 is engaged. The engaging grooves 381 are present in positions separated in the Y direction from the surface 3632 of the vertical wall section 3631. If the pair of lower end engaging claws 37 is provided on opposite surfaces of the vertical wall section 3631, the pair of upper end engaging claws 38 only has to be projected from the same surfaces.

The engaging grooves 372 of the lower end engaging claws 37 and the engaging grooves 381 of the upper end engaging claws 38 are generally present in positions opposed in the Z direction. The bottoms of the engaging grooves 372 include, for example, surfaces extended in the horizontal direction and having fixed width in the Y direction. The width in the Y direction of the engaging grooves 372 is at least larger than width obtained by adding up the thickness of the lower end side 3121 of the diaphragm plate 312 and the thickness of the lower end side 3141 of the wavelength plate 314. The bottoms of the engaging grooves 381 include, for example, surfaces extended in the horizontal direction and having fixed width in the Y direction. The width in the Y direction of the engaging grooves 381 is at least larger than width obtained by adding up the thickness of the upper end side 3124 of the diaphragm plate 312 and the upper end side 3144 of the wavelength plate 314.

A distance H3 in the Z direction between the bottoms of the engaging grooves 372 of the lower end engaging claws 37 and the bottoms of the engaging grooves 381 of the upper end engaging claws 38 is smaller than the length H1 of the diaphragm plate 312 and smaller than the length H2 of the wavelength plate 314. Accordingly, if the lower end side 3121 of the diaphragm plate 312 is engaged in the engaging grooves 372 of the lower end engaging claws 37 and the upper end side 3124 of the diaphragm plate 312 is engaged in the engaging grooves 381 of the upper end engaging claws 38 and the diaphragm plate 312 is attached to the sheet holder 363, the diaphragm plate 312 bends in an arcuate shape in the direction of the length H1.

Similarly, if the lower end side 3141 of the wavelength plate 314 is engaged in the engaging grooves 372 of the lower end engaging claws 37 and the upper end side 3144 of the wavelength plate 314 is engaged in the engaging grooves 381 of the upper end engaging claws 38 and the wavelength plate 314 is attached to the sheet holder 363, the wavelength plate 314 bends in an arcuate shape in the direction of the length H2. In other words, since the diaphragm plate 312 and the wavelength plate 314 are attached to the sheet holder 363 in a bent state, the distance H3 between the bottoms of the engaging grooves 372 of the lower end engaging claws 37 and the bottoms of the engaging grooves 381 of the upper end engaging claws 38 is set smaller than the length H1 of the diaphragm plate 312 and smaller than the length H2 of the wavelength plate 314.

In this case, the curvature of the diaphragm plate 312 is determined by the length H1 and the curvature of the wavelength plate 314 is determined by the length H2. In this embodiment, H1>H2>H3. As illustrated in FIG. 8, the diaphragm plate 312 is bent in a direction in which the center in the Z direction of the diaphragm plate 312 swells in the direction of the vertical wall section 3631, the wavelength plate 314 is bent such that the center in the Z direction of the wavelength plate 314 swells in the same direction as the direction in which the center in the Z direction of the diaphragm plate 312 swells, the wavelength plate 314 is superimposed on the swelling side (the vertical wall section 3631 side) of the diaphragm plate 312, and the diaphragm plate 312 and the wavelength plate 314 are attached to the sheet holder 363.

If the diaphragm plate 312 and the wavelength plate 314 are attached to the sheet holder 363 as explained above, the curvature of the wavelength plate 314 is smaller than the curvature of the diaphragm plate 312, the vicinities of both the ends in the Z direction of the wavelength plate 314 are slightly separated from the diaphragm plate 312, and a gap is formed between the diaphragm plate 312 and the wavelength plate 314. The center in the Z direction of the wavelength plate 314 comes into contact with the center in the bending direction of the diaphragm plate 312.

In this state, the lower end side 3121 of the diaphragm plate 312 is pressed against to engage in the engaging grooves 372 of the lower end engaging claws 37 and the upper end side 3124 of the diaphragm plate 312 is pressed against to engage in the engaging grooves 381 of the upper end engaging claws 38 by a restoration force based on elastic deformation of the diaphragm plate 312. The center in the Z direction of the wavelength plate 314 is pressed against the diaphragm plate 312. The wavelength plate 314 adheres to the opening section 3123 and is fixed to the the diaphragm plate 312.

By attaching the diaphragm plate 312 and the wavelength plate 314 to the sheet holder 363 as explained above, it is possible to fix the diaphragm plate 312 and the wavelength plate 314 to a single sheet holder 363 without using an adhesive, an adhesive tape, or the like. It is possible to reduce the number of components and an assembly manhour and relatively inexpensively assemble the device while maintaining optical performance.

If the diaphragm plate 312 is bent and attached as in this embodiment, it is desirable to set an actual size in the Z direction of the opening section 3123 slightly larger such that a size in the sub-scanning direction of a region in an imaginary XZ plane on which the opening section 3123 is projected in the Y direction in a state in which the diaphragm plate 312 is bent become size for defining a size in the sub-scanning direction of light passing through the opening section 3123.

If the wavelength plate 314 is bent as in this embodiment, it is considered likely that the optical performance of the wavelength plate 314 slightly changes. Therefore, in this embodiment, the wavelength plate 314 is disposed on the side swelled by the bending of the diaphragm plate 312 and at least the curvature of the wavelength plate 314 is set smaller than the curvature of the diaphragm plate 312 to prevent the change in the optical performance of the wavelength plate 314 due to the bending.

The wavelength plate 314 is disposed to be superimposed on the swelling side of the diaphragm plate 312 to prevent a deficiency in which the projecting section 3142 of the wavelength plate 314 and the projecting section 3122 of the diaphragm plate 312 interfere. If the curvatures of the wavelength plate 314 and the diaphragm plate 312 are maintained and superimposition order of the wavelength plate 314 and the diaphragm plate 312 is reversed, the projecting section 3142 and the projecting section 3122 interfere and undesired stress acts on the wavelength plate 314 having lower rigidity (easily bent) than the diaphragm plate 312. Therefore, in this embodiment, the wavelength plate 314 and the diaphragm plate 312 are superimposed in superimposition order for preventing the projecting section 3142 and the projecting section 3122 from interfering.

In the embodiment explained above, a case is explained in which the diaphragm plate 312 and the wavelength plate 314 are attached to the sheet holder 363 at the curvatures and in the superimposition order illustrated in FIG. 8. However, the diaphragm plate 312 and the wavelength plate 314 can be attached to the sheet holder 363 even if the superimposition order, the curvatures, the bending direction, and the like are changed. Modifications of the method of attaching the diaphragm plate 312 and the wavelength plate 314 are explained below.

Figure 9:
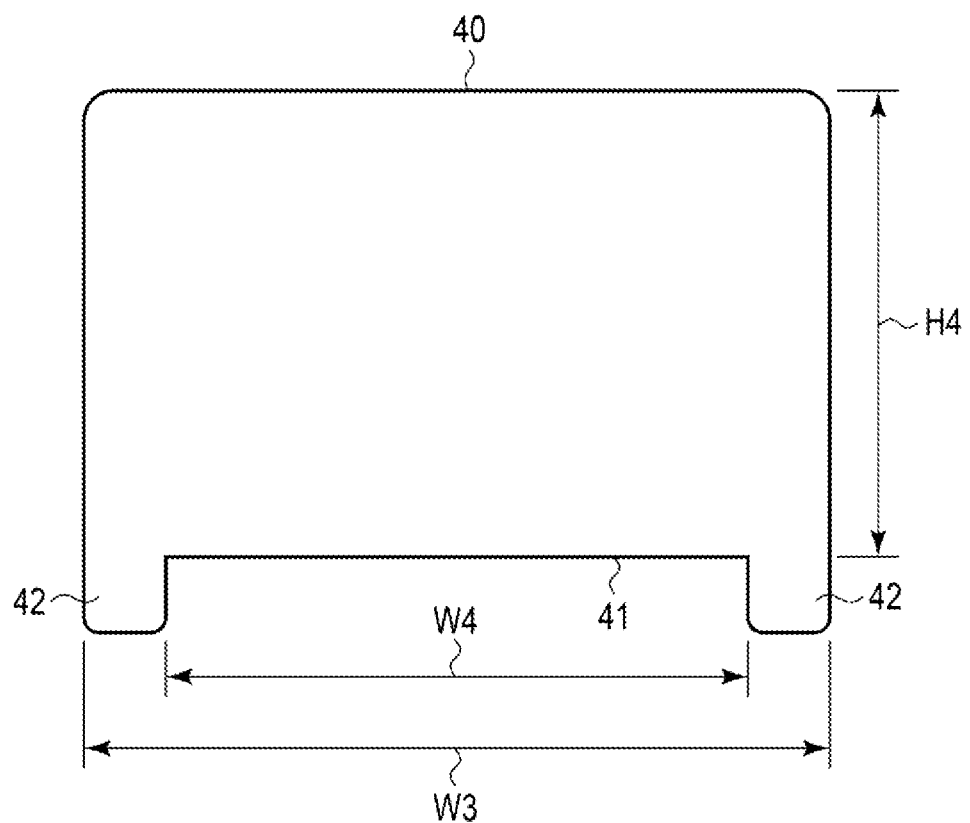
FIG. 9 is a front view illustrating a wavelength plate in a first modification.

In a first modification, the shape of the wavelength plate 314 is changed to a shape illustrated in FIG. 9. A wavelength plate 40 illustrated in FIG. 9 includes substantially rectangular two projecting sections 42 projecting in the Z direction from both the ends in the X direction of a lower end side 41 of the wavelength plate 40. Since the two projecting sections 42 are disposed on the outer side in the X direction of the pair of lower end engaging claws 37 of the sheet holder 363, the wavelength plate 40 has width W3 in the X direction larger than the width of the wavelength plate 314. A distance W4 between the two projecting sections 42 is slightly longer than the distance between the outer surfaces in the X direction of the pair of lower end engaging claws 37. In order to set a curvature of the wavelength plate 40 larger than the curvature of the diaphragm plate 312, length H4 in the Z direction excluding the two projecting sections 42 is set slightly larger than the length H1 of the diaphragm plate 312.

Figure 10:
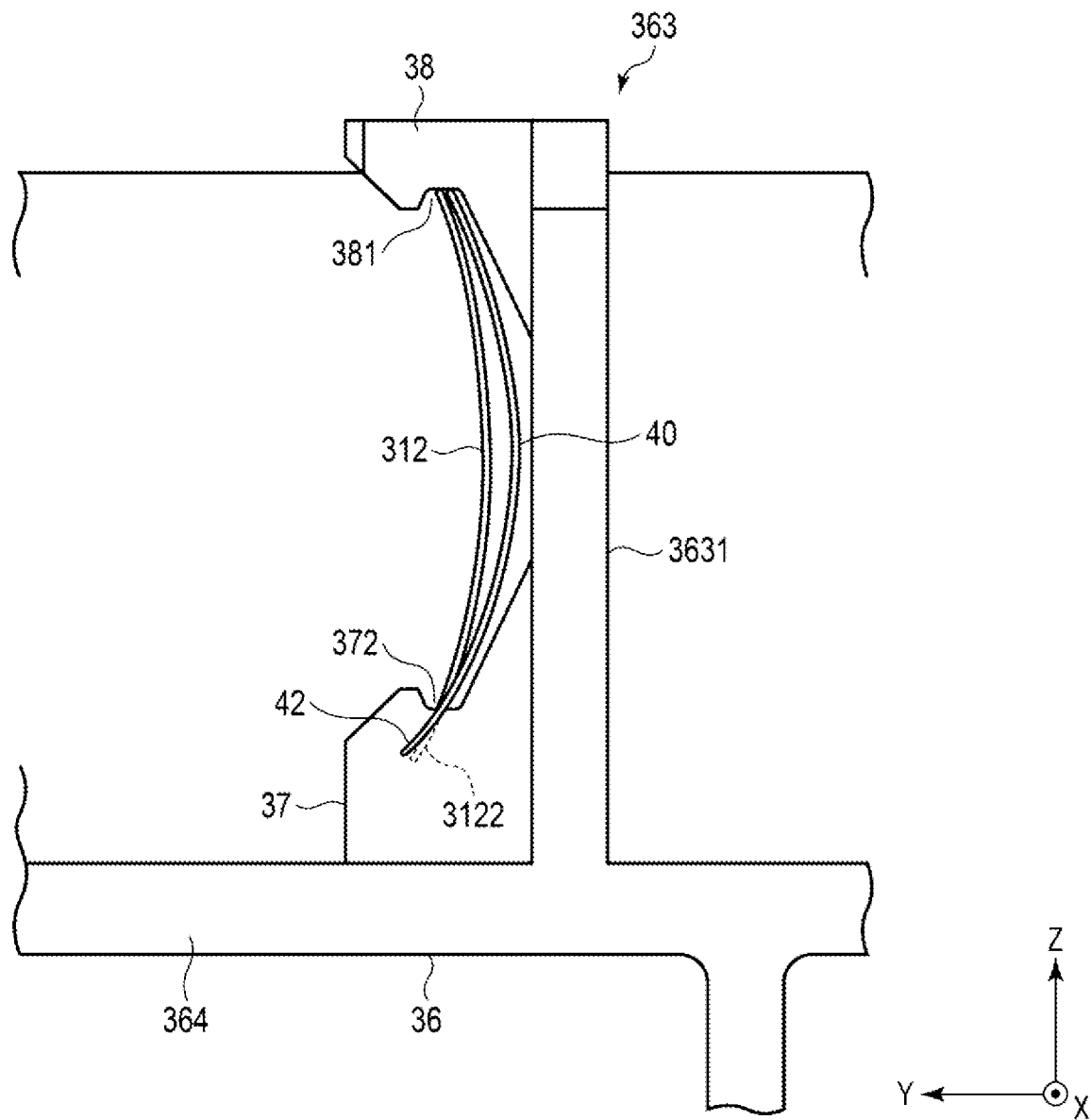
FIG. 10 is a side view of a structure in which the wavelength plate illustrated in FIG. 9 is attached to the sheet holder.

In the first modification, as illustrated in FIG. 10, the wavelength plate 40 is attached to the sheet holder 363. The diaphragm plate 312 is attached in the same manner as in the embodiment explained above. Superimposition order of the wavelength plate 40 and the diaphragm plate 312 is also the same as the superimposition order in the embodiment explained above. The wavelength plate 40 is disposed to be superimposed on the swelling side of the diaphragm plate 312. Since the length H4 of the wavelength plate 40 is set larger than the length H1 of the diaphragm plate 312, the curvature of the wavelength plate 40 is larger than the curvature of the diaphragm plate 312. A gap is formed between the diaphragm plate 312 and the wavelength plate 40 in the center in the Z direction. Since the two projecting sections 42 of the wavelength plate 40 are disposed on the outer side of the pair of lower end engaging claws 37, the two projecting sections 42 of the wavelength plate 40 and the projecting section 3122 of the diaphragm plate 312 do not interfere.

According to the first modification, the curvature of the wavelength plate 40 is slightly larger than the curvature of the wavelength plate 314 in the embodiment explained above. However, the wavelength plate 40 can be attached to the single sheet holder 363 together with the diaphragm plate 312. It is possible to achieve the same effects as the effects in the embodiment explained above. According to the first modification, since the curvature of the wavelength plate 40 is increased, the restoration force based on the elastic deformation can be increased. An engaging force of the wavelength plate 40 with the lower end engaging claws 37 and the upper end engaging claws 38 can be increased. The wavelength plate 40 can be firmly fixed by the sheet holder 363.

Figure 11:
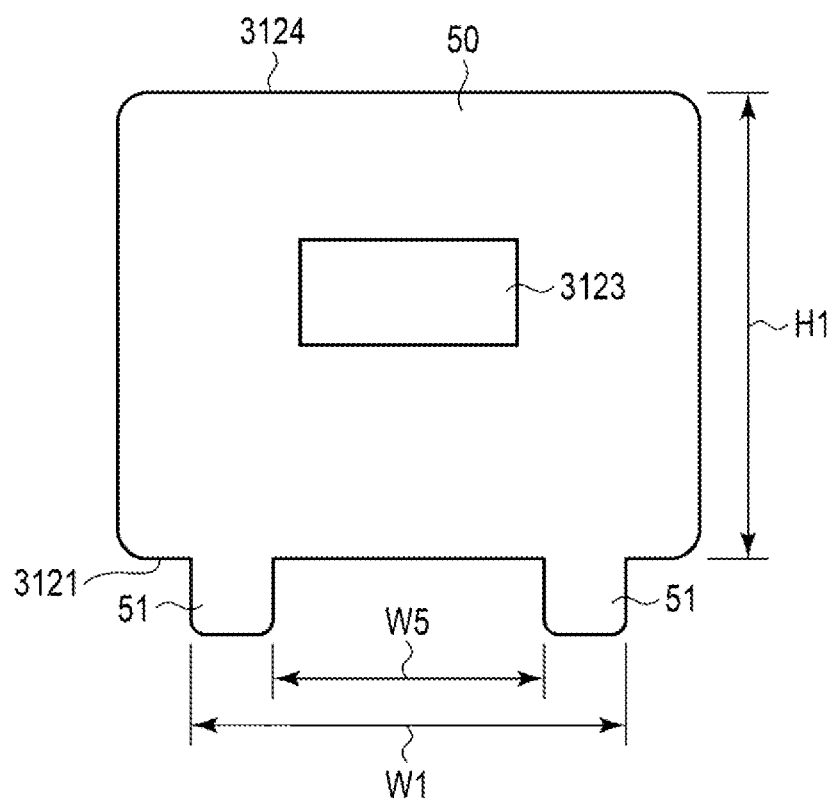
FIG. 11 is a front view illustrating a diaphragm plate in a second modification.
Figure 12:
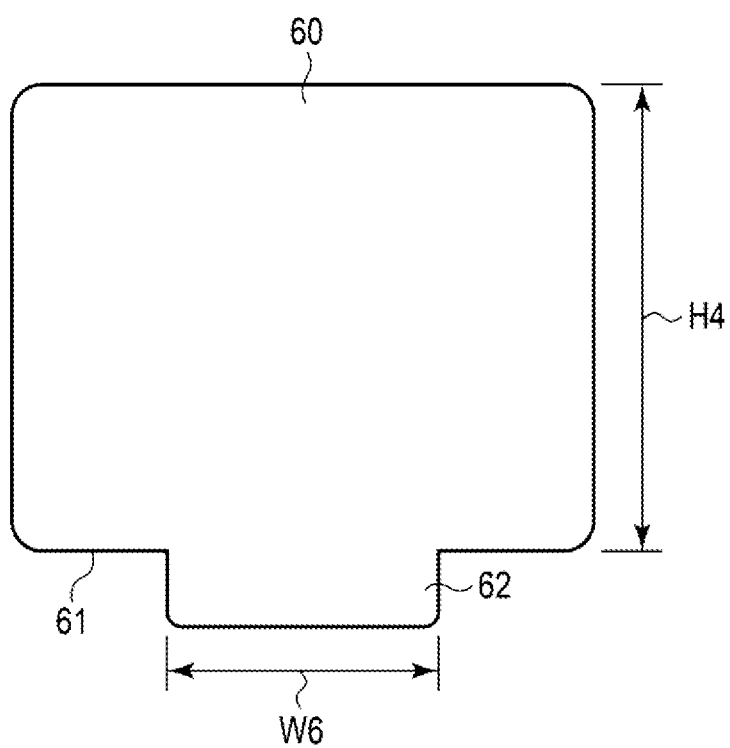
FIG. 12 is a front view illustrating a wavelength plate in the second modification.

In a second modification, the shape of the diaphragm plate 312 is changed to a shape illustrated in FIG. 11 and the shape of the wavelength plate 314 is changed to a shape illustrated in FIG. 12. A diaphragm plate 50 illustrated in FIG. 11 has the same shape as the diaphragm plate 312 in the embodiment explained above except that the diaphragm plate 50 includes substantially rectangular two projecting sections 51 projecting from the lower end side 3121 of the diaphragm plate 50. The two projecting sections 51 are formed by cutting out the center in the X direction of the projecting section 3122 of the diaphragm plate 312 at width W5.

A wavelength plate 60 illustrated in FIG. 12 includes a substantially rectangular projecting section 62 projecting from the center in the X direction of a lower end side 61 of the wavelength plate 60. Width W6 of the projecting section 62 is slightly smaller than the width W5 of the cutout portion of the diaphragm plate 50. The length in the Z direction of the wavelength plate 60 is H4 and is the same as the length of the wavelength plate 40 in the first modification.

Figure 13:
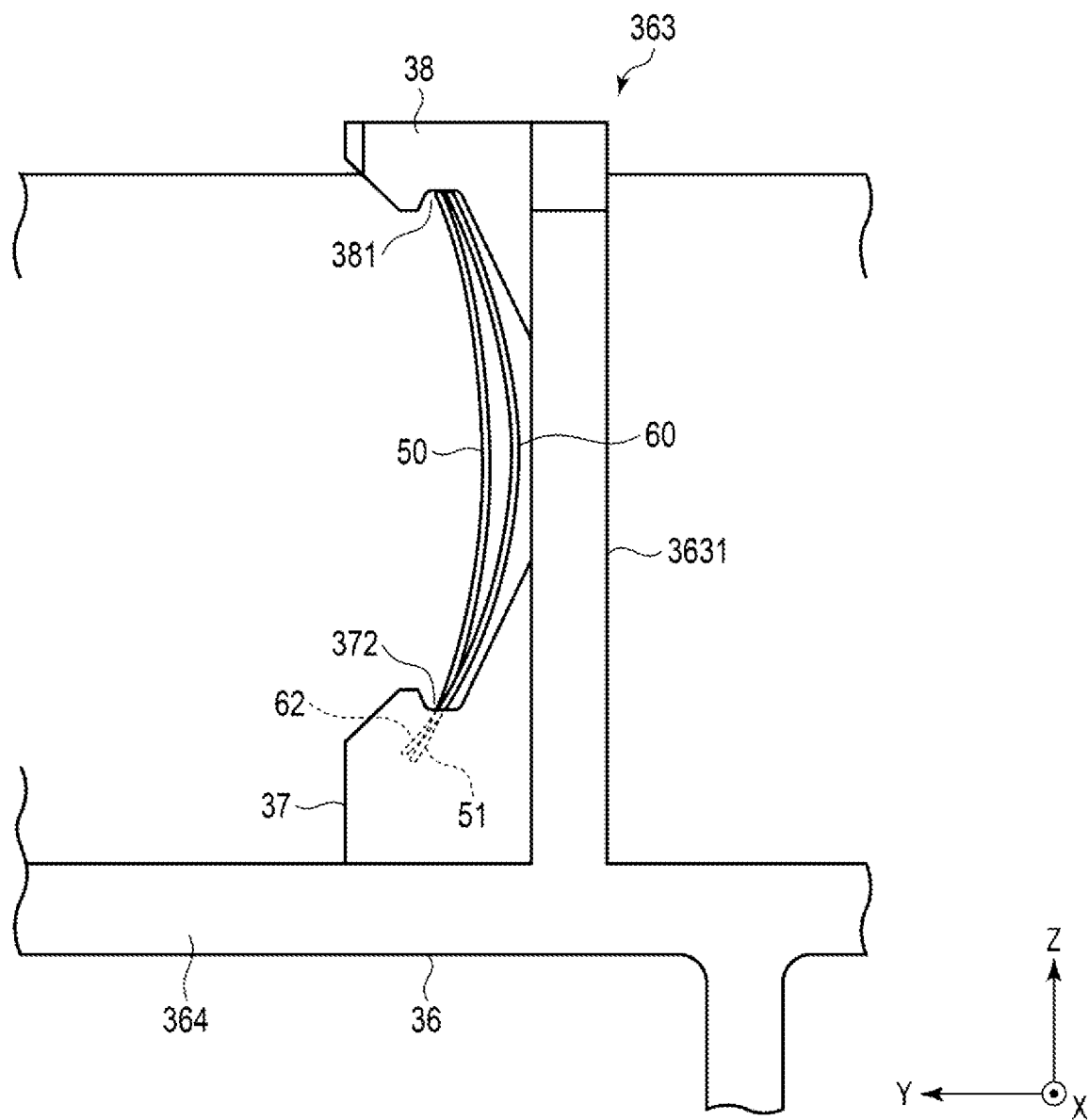
FIG. 13 is a side view of a structure in which the diaphragm plate illustrate in FIG. 11 and the wavelength plate illustrated in FIG. 12 are attached to the sheet holder.

In the second modification, as illustrated in FIG. 13, the diaphragm plate 50 and the wavelength plate 60 are attached to the sheet holder 363. The diaphragm plate 50 is attached in the same manner as the diaphragm plate 312 explained above. Superimposition order of the diagraph plate 50 and the wavelength plate 60 is the same as the superimposition order in the first modification. The wavelength plate 60 is disposed to be superimposed on a swelling side of the diaphragm plate 50. In the second modification, the projecting section 62 of the wavelength plate 60 is inserted into between the two projecting section 51 of the diaphragm plate 50. Consequently, as in the first modification, it is possible to prevent a deficiency in which the projecting section 51 of the diaphragm plate 50 and the projecting section 62 of the wavelength plate 60 interfere.

In the embodiment and the modifications thereof explained above, bending directions of the diaphragm plate 312 (50) and the wavelength plate 314 (40, 60) may be reversed. From the viewpoint of assembly work, the bending directions of the diaphragm plate 312 (50) and the wavelength plate 314 (40, 60) are desirably set in the directions in the embodiment and the modifications explained above.

In the embodiment and the modifications thereof explained above, the lengths and the curvatures of the diaphragm plate 312 (50) and the wavelength plate 314 (40, 60) are differentiated. However, a diaphragm plate and a wavelength plate may be bent at the same curvature and attached to be superimposed without a gap.

Further, in the embodiment and the modifications thereof, a polarizing plate may be incorporated in the device instead of the wavelength plate 314 (40, 60).

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An optical scanning device, comprising:
a light source configured to emit light;
a first optical sheet disposed on an optical path of the light emitted from the light source in a state in which the first optical sheet is bent by elastic deformation;
a second optical sheet disposed on the optical path, configured to transmit the light, and bendable by elastic deformation;
a holding section including a pair of engaging members with which both end portions in a bending direction of the first optical sheet are engaged by a restoration force based on the elastic deformation of the first optical sheet and with which both end portions in a bending direction of the second optical sheet are engaged by a restoration force based on the elastic deformation of the second optical sheet in a state in which the second optical sheet is bent at a curvature different from a curvature of the first optical sheet and in a same direction as the bending direction of the first optical sheet, the holding section holding the first optical sheet and the second optical sheet in a state in which the first optical sheet and the second optical sheet are superimposed via a gap; and
a polygon mirror configured to reflect the light from the light source guided via the first optical sheet and the second optical sheet and rotate to scan a scan surface present in a reflecting direction of the light.

2. The optical scanning device according to claim 1, wherein the light source is a laser array including a plurality of light emitting elements disposed side by side in a scanning direction by the polygon mirror.

3. The optical scanning device according to claim 1, wherein
the first optical sheet is a diaphragm plate including an opening section that allows the light to pass, and
the second optical sheet is a wavelength plate that transmits the light and changes a polarization direction of the light.

4. The optical scanning device according to claim 3, wherein the wavelength plate is bent at a curvature smaller than a curvature of the diaphragm plate and is superimposed on a side swelled by the bending of the diaphragm plate.

5. The optical scanning device according to claim 4, wherein a center in the bending direction of the wavelength plate is in contact with a center in the bending direction of the diaphragm plate.

6. The optical scanning device according to claim 4, wherein
the diagraph plate includes a first projecting section projecting from one end in the bending direction to a first direction orthogonal to the one end,
the wavelength plate includes a second projecting section projecting from one end in the bending direction opposed to the one end of the diaphragm plate to the first direction orthogonal to the one end,
one of the engaging members, with which the one end of the diaphragm plate and the one end of the wavelength plate engage, of the holding section includes a pair of positioning surfaces that locks both ends in a second direction orthogonal to the first direction of the first projecting section and restricts movement of the first projecting section in the second direction, and
the pair of positioning surfaces locks both ends in the second direction of the second projecting section of the wavelength plate and restricts movement of the second projecting section in the second direction.

7. The optical scanning device according to claim 6, wherein a center in the bending direction of the wavelength plate is in contact with a center in the bending direction of the diaphragm plate.

8. The optical scanning device according to claim 3, wherein the wavelength plate is a half wavelength plate that changes the polarization direction of the light by 45°.

9. The optical scanning device according to claim 3, wherein the wavelength plate is a quarter wavelength plate that changes linearly polarized light to circularly polarized light.

10. The optical scanning device according to claim 3, wherein the wavelength plate is a wavelength plate obtained by sandwiching a double refraction film with polyethylene terephthalate sheets.

11. An image forming apparatus, comprising:
a document feeder;
a photoconductive drum;
a developing device;
a fixing device;
an optical scanning device, comprising:
a light source configured to emit light;
a first optical sheet disposed on an optical path of the light emitted from the light source in a state in which the first optical sheet is bent by elastic deformation;
a second optical sheet disposed on the optical path, configured to transmit the light, and bendable by elastic deformation;
a holding section including a pair of engaging members with which both end portions in a bending direction of the first optical sheet are engaged by a restoration force based on the elastic deformation of the first optical sheet and with which both end portions in a bending direction of the second optical sheet are engaged by a restoration force based on the elastic deformation of the second optical sheet in a state in which the second optical sheet is bent at a curvature different from a curvature of the first optical sheet and in a same direction as the bending direction of the first optical sheet, the holding section holding the first optical sheet and the second optical sheet in a state in which the first optical sheet and the second optical sheet are superimposed via a gap; and
a polygon mirror configured to reflect the light from the light source guided via the first optical sheet and the second optical sheet and rotate to scan a scan surface present in a reflecting direction of the light; and
a paper discharge tray.

12. The image forming apparatus according to claim 11, wherein the light source is a laser array including a plurality of light emitting elements disposed side by side in a scanning direction by the polygon mirror.

13. The image forming apparatus according to claim 11, wherein
the first optical sheet is a diaphragm plate including an opening section that allows the light to pass, and
the second optical sheet is a wavelength plate that transmits the light and changes a polarization direction of the light.

14. The image forming apparatus according to claim 13, wherein the wavelength plate is bent at a curvature smaller than a curvature of the diaphragm plate and is superimposed on a side swelled by the bending of the diaphragm plate.

15. The image forming apparatus according to claim 14, wherein a center in the bending direction of the wavelength plate is in contact with a center in the bending direction of the diaphragm plate.

16. The image forming apparatus according to claim 14, wherein
the diagraph plate includes a first projecting section projecting from one end in the bending direction to a first direction orthogonal to the one end,
the wavelength plate includes a second projecting section projecting from one end in the bending direction opposed to the one end of the diaphragm plate to the first direction orthogonal to the one end,
one of the engaging members, with which the one end of the diaphragm plate and the one end of the wavelength plate engage, of the holding section includes a pair of positioning surfaces that locks both ends in a second direction orthogonal to the first direction of the first projecting section and restricts movement of the first projecting section in the second direction, and
the pair of positioning surfaces locks both ends in the second direction of the second projecting section of the wavelength plate and restricts movement of the second projecting section in the second direction.

17. The image forming apparatus according to claim 16, wherein a center in the bending direction of the wavelength plate is in contact with a center in the bending direction of the diaphragm plate.

18. The image forming apparatus according to claim 13, wherein the wavelength plate is a half wavelength plate that changes the polarization direction of the light by 45°.

19. The image forming apparatus according to claim 13, wherein the wavelength plate is a quarter wavelength plate that changes linearly polarized light to circularly polarized light.

20. The image forming apparatus according to claim 13, wherein the wavelength plate is a wavelength plate obtained by sandwiching a double refraction film with polyethylene terephthalate sheets.

* * * * *